United States Patent [19]

Bogren

[11] Patent Number: 4,640,733

[45] Date of Patent: Feb. 3, 1987

[54] APPARATUS FOR FORMING AND INSERTING AN INTERNAL LID IN A CONTAINER

[76] Inventor: Ingemar S. B. Bogren, 193 00, Sigtuna, Sweden

[21] Appl. No.: 694,400

[22] PCT Filed: May 15, 1984

[86] PCT No.: PCT/SE84/00180

§ 371 Date: Jan. 7, 1985

§ 102(e) Date: Jan. 7, 1985

[87] PCT Pub. No.: WO84/04507

PCT Pub. Date: Nov. 22, 1984

[30] Foreign Application Priority Data

May 19, 1983 [SE] Sweden .............................. 8302841

[51] Int. Cl.[4] .............................................. B31F 7/00
[52] U.S. Cl. ............................ 156/380.2; 156/380.8;
156/69; 156/73.1; 156/275.1; 156/580.1;
156/581; 53/361; 53/362; 53/328; 53/489
[58] Field of Search ..................... 156/379.8, 380.2, 69,
156/73.1, 73.5, 380.8, 275.1, 275.7, 272.2, 273.7,
293, 580.1, 581, 583.1, 379.6; 229/3.1, 5.8, 3.5
MF; 493/109; 53/361-362, 348, 324, 328, 487,
489, 373; 118/319

[56] References Cited

U.S. PATENT DOCUMENTS

| | | | |
|---|---|---|---|
| 1,888,397 | 11/1932 | Slick | 53/362 |
| 2,402,943 | 7/1946 | Bogoslowsky | 156/69 |
| 2,423,965 | 7/1947 | Coyle | 53/362 |
| 3,346,435 | 10/1967 | Beck | 156/69 |
| 3,549,440 | 12/1970 | Adcock et al. | 156/272.4 |
| 3,700,513 | 10/1972 | Haberhauer | 156/69 |
| 4,282,699 | 8/1981 | Embro, Jr. | 156/69 |

FOREIGN PATENT DOCUMENTS 2051668 1/1981 United Kingdom ................. 156/69

*Primary Examiner*—Michael Wityshyn
*Assistant Examiner*—Merrell C. Cashion
*Attorney, Agent, or Firm*—James E. Nilles

[57] ABSTRACT

An apparatus for inserting an internal lid (6, 7) in a tubular formed container (1) and for sealed connections of the lid to the inner of the container tube by constant heat welding, high frequency welding or ultrasonic welding and comprising a carrier (8) for holding the container tube (1) while introducing and weld connection the lid (6, 7), a support provided above the carrier (8) for positioning a plane punched out lid blank having a larger outer periphery than the inner periphery of the container tube, a piston means (16) pressing the lid blank into the container tube while folding a narrow edge rim (7) upwards from the lid plane (6) and in which the piston means comprises a lower piston part (18) and an upper piston part (20) which are axially movable in relation to each other and an expandable means (19) between said two piston parts (18, 20) which expandable means is pressed radially outwards when the two piston parts (18, 20) are compressed. The bottom of the lower piston part (18) is formed with a thin press edge (21) having an outwards-downwards sloping surface (24) which at the inner part thereof is directly succeeded by a flute (22). The upper piston part (20) which at the bottom is cup-shaped (25) is axially movable on the lower piston part (18) into and from contact with the expandable means (19). The expandable means preferably is a rubber ring (23) the form of which is changed when the upper piston part and the lower piston part are compressed, whereby the rubber ring is formed with a radially outwards directed pressure line (26) engaging the fold up lid rim (7) adjacent the very lid plane (6). The carrier (8) and the press piston (16) has substantially parallel cylindrical sides, whereby the weld pressure practically solely is provided by the expandable means (19) within area of the means (10) of the carrier for providing welding heat.

5 Claims, 6 Drawing Figures

APPARATUS FOR FORMING AND INSERTING AN INTERNAL LID IN A CONTAINER

The present invention relates to an apparatus for forming and inserting an internal lid in a tubular package of cardboard or any other material having equivalent strength properties and for sealed connection of the lid to the inner surface of the package by constant heat welding, high frequency welding or ultrasonic welding, comprising a carrier for supporting the package tube while introducing and weld connecting the lid in the interior of the tube, a support for positioning a plane punched lid blank having a larger periphery than the package or container tube, a piston means for forcing said lid blank into the container tube during which operation an edge of the lid blank is folded upwards, the piston means comprising a lower part and an upper part which are axially movable in relation to each other and between said two parts an expandable means which is pressed radially outwards when the two piston parts are moved axially towards each other.

An apparatus of the above defined type is known from applicant's own Swedish patent (patent application No. 810005334-0, equivalent to U.S. application Ser. No. 414,056). The patent shows an apparatus in which both the press piston and the carrier for the container tube are at least slightly conically widened adjacent the area in which the piston is to be introduced in the container tube and welded to the inner surface of said container tube. The patent mainly discusses containers having a body of cardboard or similar material.

It has been shown that the conical form of the press piston and of the carrier is not necessary and that a conical form thereof may even in some cases provide problems in the manufacture of containers made of stiff cardboard or a bulky cardboard material. Said problems especially relate to sealing problems at the joint between the lid edge and the container tube. The problems also may relate to the exact adjustment of the position of the press piston. In case of a slightly too high position of the press piston in relation to the cone of the carrier the contact pressure between the lid edge and the container tube is too low and the joint, especially the weld joint between said two parts, becomes imperfect and may provide a leakage. On the other hand, in case of a too low position of the press piston the contact pressure is too high, which may cause the joining material, for instance the weldable plastic material, to be pressed out of the joint, whereby a too narrow thickness of material is obtained in the press joint, and in addition thereto these may even be a risk of burning through. In both cases there is a risk of leakage.

Further when the lid is forced into the end of the container tube, folds and wrinkles unavoidably appear in the folded up lid edge or lid rim by means of which the lid is connected to the container tube. Said folds or wrinkles become heavier the thicker the material is in the lid, and further the size of said folds and wrinkles increases with increasing distance from the bottom surface of the lid. The joint, especially the weld joint between the lid edge or lid rim and the inner surface of the container tube therefore should be placed as close to the bottom of the lid as possible, and at the same time the height of the lid rim may be reduced. Also considering the consumption of the material and the wish to utilize as much of the volume of the container tube as possible it is a wish that the lid rim is as low as possible. In applicant's above mentioned previous patent the lid is welded to the container tube over a relatively large portion of the height of the lid rim, and the metal ring for providing the constant welding, the high frequency welding or the ultrasonic welding is provided relatively close to the upper end of the lid rim.

For providing a good and sealed weld joint it is important that the pressure between the lid rim and the container is maintained between a specific lowest and highest pressure. A pressure that is too low gives an imperfect weld joint and a risk of leakage, a pressure that is too high in turn may press a part of the weldable material out of the joint area thereby giving an imperfect joint and a so called burning through of the material and subsequent leakage. The piston therefore must be moved down to a very exactly determined lowest position in which the exactly predetermined pressure is obtained. The necessary pressure, however may vary at least depending on variations in thickness of the cardboard material of which the container and the lid are made and depending on other external circumstances.

Obviously, it has not been considered possible to provide a good weld joint unless the carrier under the piston is conical so that a press surface is obtained which extends over the entire height of the folded up lid rim. Now it has, however, proved, contrary to what may be expected, that an improved weld joint is obtained if the weld contact surface between the folded up lid rim and the inner surface of the container is made more narrow than the height of the lid rim, and it is even possible to get a good weld joint by means of an almost linear press surface from the expandable means of the piston.

Thus it has shown that a quite parallel cylindrical press piston acting against an at least substantially parallel cylindrical surface of the container tube gives an improved safety of sealing between the lid rim and the container tube, eliminating the problem of getting too low or too high a pressure in that the press piston is moved down too short a distance or too long a distance respectively. At the same time it is possible to control the location of the weld joint very carefully at the lid rim, and by giving the press piston a special design the weld joint may be located very close to the bottom portion of the lid rim, that is close to the very lid surface. In order to get the expandable means of the press piston to operate as close to the bottom of the lid rim as possible the lower part and the upper part of the press piston, however, must be given a special design which will be specifically described in the following.

The object of the invention therefore is to solve the problem of providing an apparatus for forming and inserting an internal lid of a tubular package or container, which apparatus is constructed so that the lid can be placed and welded practically anywhere along the interior of the container tube without the risk that the press piston produces too low or too high a pressure of the lid rim in relation to the container tube, and so that the weld joint can be located very close to the bottom portion of the lid rim where the folds and wrinkles have a minimum size. Thereby the apparatus is substantially simpler than previously known apparatus, and especially a substantially improved safety against leakage in the container and the lid is obtained.

Therefore the invention relates to a tool for sealed mounting of an inner lid having a folded up lid rim at the end of a container of cardboard or a material having equivalent strength characteristics, which tool is so constructed that the problems of a too soft or too hard press contact between the lid rim and the inner surface of the container are eliminated,.the problem of moving the piston down to a very exactly determined lowest position is eliminated, and a good and sealed weld joint is under all circumstances obtained between the lid rim and the inner surface of the container. Both the carrier and the piston are formed with substantially straight sides, whereby the weld pressure is provided practically completely by the expandable means, namely within the area of the carrier means for providing the weld heat. The means for providing the weld heat is a ring of a conducting material extending round the entire carrier and providing a contact surface with the outer surface of the container, and the expandable means is a rubber ring, which in the non-expansive position is located slightly inside the outer subscribing surface of the piston, whereby there is no risk that the ring is stopped or is clamped between the piston or the lid ring.

Further characteristics of the invention will be evident from the following detailed description in which references will be made to the accompanying drawings.

In the drawings

Figure 5:
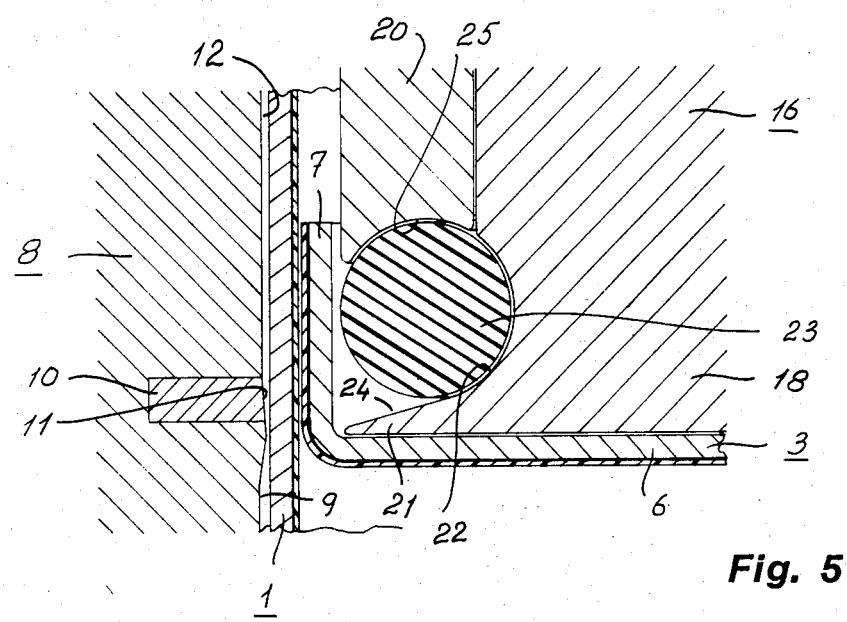
FIG. 5 is a more detailed view on a larger scale of a portion of the press piston according to FIG. 4 in a stage of introducing the lid into the interior of the container.
Figure 6:
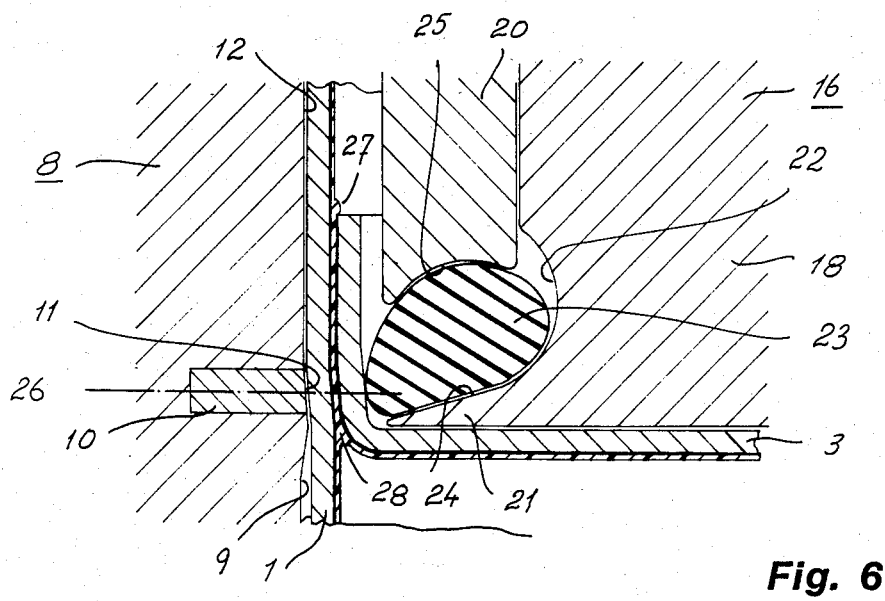
FIG. 6 shows the press piston during the welding operation.

A package or conatiner made by means of the apparatus according to the invention comprises a sleeve 1 of cardboard or a similar stiff material made from a plane blank of material, which has been been joined at a longitudinal joint 2, and where the sleeve at the top is provided with an internal lid 3 and at the bottom with a corresponding inner bottom. In the illustrated embodiment the upper edge 4 of the container is curled inwards to provide an even and smooth end of the container covering the lid edge and stabilizing the container at both ends. In the illustrated case the container is circular cylindrical, but it is obvious that the container may be given any polygonal or other cross section form provided that the polygon corners are rounded. The lid and the bottom are made from a flat punched out blank 5 which before being pressed down in the container tube or in connection thereto is formed to a lid plane 6 and a circumperipheral lid rim that extends upwards from said lid plane as best shown in FIGS. 5 and 6. As previously mentioned it is a wish to have as low a lid rim 7 as possible both in order to obtain the smallest possible waste amount of material and also to utilize the largest possible volume of the container. Since the weld joint between the lid rim and the inner surface of the container is located as close to the bottom lid plane 6 as possible the lid rim 7 can be made lower than has previously been possible without adversely affecting the sealing of the container.

Figure 3:
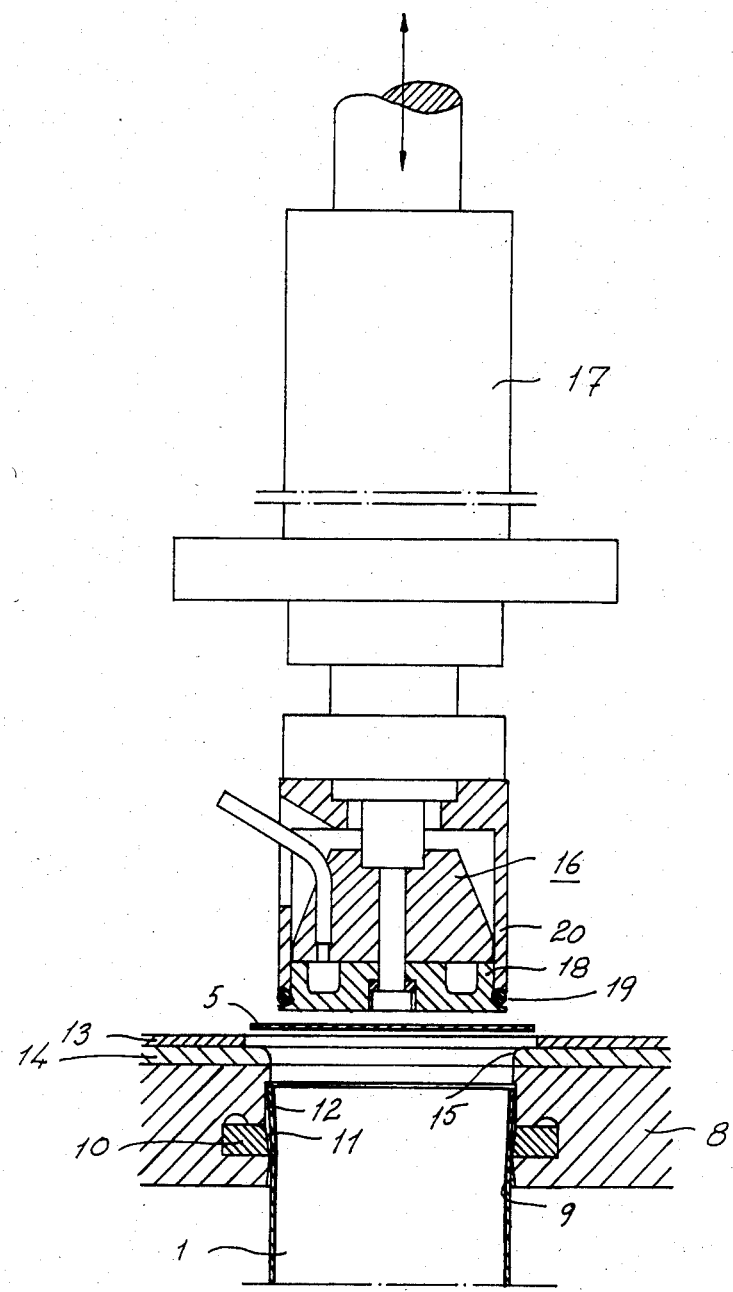
FIG. 3 shows a lid forming apparatus according to the invention.
Figure 4:
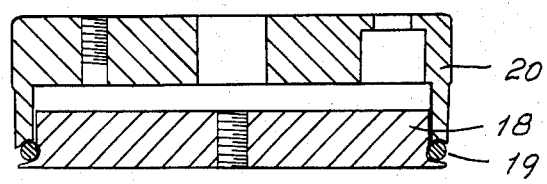
FIG. 4 is a cross section of a press piston included in the apparatus of FIG. 3.

The apparatus shown in FIG. 3 comprises a carrier 8 for carrying the container sleeve 1 when the lid is formed and is being weld connected to the container. The carrier 8 has substantially the same outer shape as the sleeve 1, but at the lower part it is formed with a guide cone 9 for making it easy to introduce the sleeve 1 from underneath the carrier. it is also formed with an annular welding tool 10, which is preferably a ring for transmitting high frequency heat or ultrasonic heat to the weld joint of the lid and/or the container sleeve. In order to give the part of the sleeve located above the weld tool 10 a possibility of expanding slightly during the welding operation the welding tool 10 preferably is slightly conically widened in an upward direction. The cone 11 of the welding tool 10 is very little and can hardly be observed by the naked eye, the cone angle may be between 2° or 6°. From the upper edge of the welding tool and in the direction upwards the carrier 8 is widened to a parallel cylinder 12 the periphery of which coincides with the upper edge of the welding tool 10. For providing a stop edge defining the uppermost position of the container sleeve in the carrier the said widened part 12 may be formed with a shoulder.

On top of the the carrier 8 a lid shaping tool is mounted which comprises a support disc 13 having a bore and on which the lid blank is placed and, below the support disc 13, a formation disc 14 with rounded upper edges 15. In order to make it possible to provide the circumperipherally extending rim the lid blank 5 must be slightly larger than the inner area of the sleeve 1, and the bore of the support disc 13 is of correspondingly larger size. It should be noted that the lid also can be formed by being directly pressed into the sleeve whereby the support disc and the formation disc can be included.

The tool also includes a press piston 16 and a means known per se for moving the press piston 16 upwards and downwards for forming and pressing the lid into the container sleeve and for widening the expandable means of the press piston in connection with the welding operation. The means 17 for moving the press piston peferably is a hydraulic or pneumatic cylinder or any other previously known means. The press piston 16 comprises a lower part 18 which is also the carrier for the expandable means 19, and an upper part 20 which is mounted round a shaft portion of the lower part 18. The lower part and the upper part of the press piston are axially movable in relation to each other, and they are formed so that the expandable means 19 is expanded when the lower part and the upper part of the press piston are moved towards each other, whereby the expansion of said expandable means 19 is made so that a press surface is obtained as close to the common area of the lid rim 7 and the lid plane 6 as possible.

For this purpose the lower part 18 of the press piston is formed with a very thin press edge 21 which slopes outwards-downwards as best shown in FIGS. 5 and 6. The lower part 18 also is formed with a flute around it that extends some distance radially into the lower part and the shape of which corresponds to the shape of the expandable means 19 in its non-expanded state. The expandable means is a toroidal ring 23 of rubber or any other suitable elastic material, preferably having a circular cross-section when unexpanded, and the flute 22 consequently is of circular cylindrical form. The flute 22 may be of such circumferential extent in cross section as to enclose between 90° and 160° of the rubber ring. The lower end of the flute 22 directly merges into the outwards-downwards sloping surface 24 of the press edge 21. The press edge 21 has an outer diameter which is so much less than the inner diameter of the container sleeve 1 that the lid can be pressed down in the container sleeve with an easy slip fit. The outer diameter of the press edge therefore should be less than the inner diameter of the sleeve by an amount corresponding to twice the thickness of the lid material plus a tolerance play of 0.5-1%. The upper part 20 is movable outside the lower part 18 with an easy slip fit and it should have an outer diameter which is slightly larger than the outer diameter of the press edge 21. The bottom edge of the lower part 20 is cup shaped at 25 with a size which corresponds to or is larger than the diameter of the rubber ring 23. The form of the cup shaped surface 25 should be such as to give the rubber ring 23 as low an outer pressure line 26 as possible when compressing the ring, and for this purpose the cup surface 25 is lower at the outer surface than at the inner surface of the upper piston part 20.

At previously mentioned the carrier 8 is formed with a lower guide cone 9, and the welding tool 10 has an upwardly directed cone 11 which is directly succeeded by the widened cylindrical portion 12. The cone parts of the carrier are very small. In a practical embodiment of the tool, which is intended for manufacture of a circular cup-container of cardboard having an inner diameter of 72.6 mm, the carrier is formed with a guide cone of 7°, and the welding tool 10 which has a height of 3.8 mm is formed with an upwardly widened cone of 3°, which gives a tolerance in the widened cylindrical portion of about 0.2 mm. In a practical embodiment of the invention a container was made of the same material as the sleeve and the lid, and the material was cardboard which at the surface that became the inside of the container was laminated with aluminum and a weldable polyethylene. The total thickness of the material was 0.5 mm. The container had an inner diameter of 72.6 mm and the diameter of the press edge 21 was 71.2 mm, which means a tolerance of 0.4 mm in addition to the width of twice the thickness of the material. The outer diameter of the upper part 20 was made without any tolerance and therefore has a diameter of 71.6 mm.

After the container sleeve 1 is introduced in the carrier 8 the piston 16 is pressed down whereby the lid blank 5 is shaped against the rounded upper edge of the formation disc or ring 14, and whereby the lid is formed with an upwardly directed rim 7. The piston is moved down to a predetermined distance which is calculated so that the press surface of the rubber ring 23 is located radially inwardly opposite the welding ring 10. In the compressed condition the rubber ring 23 provides an almost linear press surface lying in a plane 26 that passes through the welding ring 10 and is normal to its axis. After heat has been supplied in the welding ring 10 the rubber ring 23 expands when the two parts 18, 20 of the press piston are moved together, whereby the weldable layers of the container sleeve and the lid melt together. Melted material has the possibility of creeping both downwards and upwards, and the part of the container sleeve and the lid rim located above the welding ring 10 has the possibility of slightly expanding for self-controlling of the contact pressure at said parts. The welding only takes some seconds and after the welding is finished the part 20 of the press piston is moved back from the lower part 18 of the press piston 16, whereby the rubber ring 23 regains its circular form with the outer surface of the ring located inside a line corresponding to the outer surface of the upper part 20, and the piston is retracted to be ready for a new operation cycle.

Figure 1:
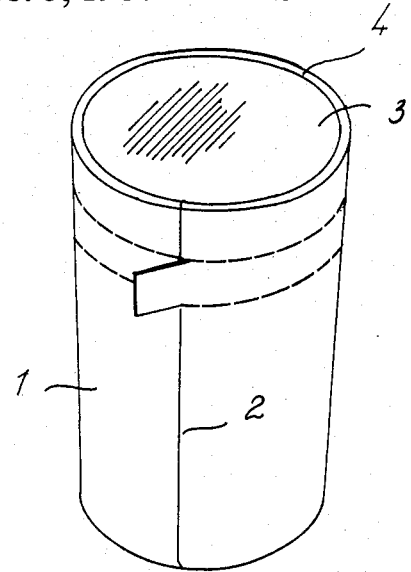
FIG. 1 shows in perspective view, a finished container made by means of an apparatus according to the invention.
Figure 2:
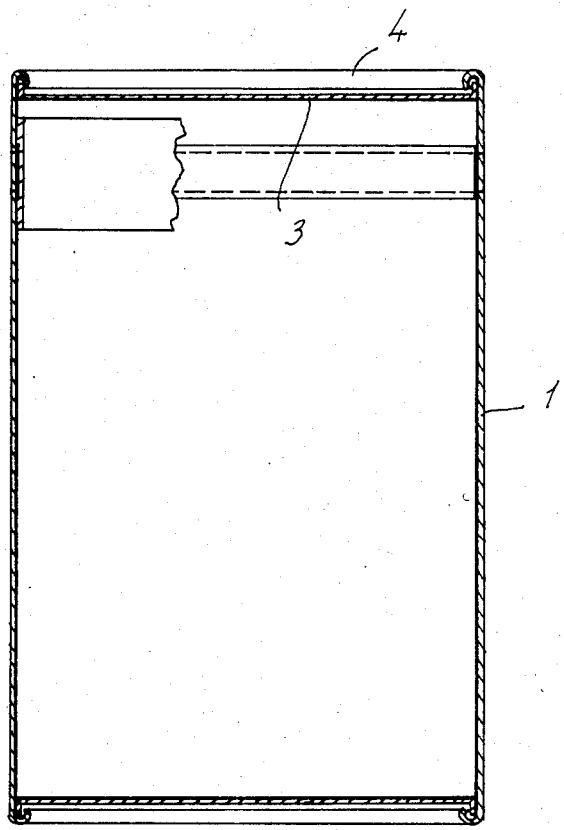
FIG. 2 is a vertical cross section through such a container.

As best illustrated in FIG. 6 the outermost pressure surface 26 of the rubber ring 23 is placed very close to the lid plane 6 and substantially right in front of the welding tool 10. During the welding operation the plastic layer of the lid will melt together with the plastic layer of the sleeve, and some portions of the weldable plastic layers are pressed upwards and downwards thereby providing thickened portions 27 and 28 of plastic material which contributes to giving a good sealing in the lid and the sleeve. After the lid and the sleeve are welded together the upper edge 4 is curled inwards as shown in FIGS. 1 and 2.

It is to be understood that the above specification and the embodiments of the invention shown in the drawings are only illustrating examples and different modifications may be presented within the scope of the appended claims.

I claim:

1. Apparatus whereby an internal closure having a flat lid portion surrounded by an upwardly projecting rim portion is inserted into an upper end portion of a tubular container sleeve and whereby said rim portion is sealed to the sleeve by welding, said apparatus being of the type comprising a carrier in which a container sleeve is receivable for immobilized support, a welding ring in said carrier for surrounding said upper end portion of a sleeve therein and heating the same, and a piston means movable up and down relative to the carrier between a raised position above a sleeve in the carrier and a defined lowered position wherein the piston means is received in the carrier and at which a closure carried by the piston means has its rim portion radially opposite said welding ring, said piston means comprising coaxial upper and lower piston parts which are axially movable relative to one another and a resilient ring confined between said piston parts to be radially outwardly expanded by relative motion of said piston parts towards one another, for cooperation with the carrier in clamping the rim portion and the sleeve in tight engagement with one another, said apparatus being characterized by:

A. said resilient ring being toroidal;
B. said lower piston part having
  (1) a flat bottom surface for closely overlying the lid portion of a closure,
  (2) a circumferential groove which is spaced above said bottom surface and in which said resilient ring is closely received when unexpanded, and
  (3) an annular upper surface which is inclined downwardly and radially outwardly, into which said groove merges downwardly and which cooperates with said bottom surface to define a thin edge around the bottom of the lower piston part;
C. said upper piston part having an annular lower portion with cylindrical and concentric radially inner and outer surfaces that concentrically surrounds said lower piston part above said annular upper surface thereon, said upper piston part further having an annular bottom surface with a radially inner edge and a radially outer edge at its respective junctions with said radially inner and outer surfaces
  (1) which annular bottom surface opposes said upper surface on the lower piston part, (2) which annular bottom surface has an arcuate cross-section profile between said inner and outer edges that substantially mates with the upper portion of the resilient ring when the same is unexpanded, and (3) which annular bottom surface has said radially outer edge at a level substantially below the level of said radially inner edge so that upon downward motion of the upper piston part relative to the lower piston part said annular bottom surface cooperates with said annular upper surface to so expand the resilient ring radially outwardly that the maximum girth thereof is in a plane which is parallel and near to said flat bottom surface and which passes through said welding ring all around the same.

2. The apparatus of claim 1 wherein said carrier has a first substantially cylindrical internal surface below said welding ring wherein a container sleeve is closely receivable, further characterized by:

(1) said welding ring having a slightly conical inner surface that widens upwardly, and (2) the carrier having a second substantially cylindrical inner surface above said welding ring with a diameter equal to that of the widest part of the welding ring.

3. The apparatus of claim 2 further characterized by said carrier having a circumferential downwardly facing internal shoulder around the top of said second substantially cylindrical inner surface that defines the uppermost position of a container sleeve received therein.

4. The apparatus of claim 1 wherein said defined lowered position of the piston means is such that the flat bottom surface of the lower piston part is substantially coplanar with the bottom edge of the welding ring.

5. The apparatus of claim 1 wherein the diameter of said radially outer surface on the upper piston part is slightly greater than that of said thin edge around the bottom of the lower piston part.

* * * * *